US010147283B2

(12) United States Patent
Weil et al.

(10) Patent No.: US 10,147,283 B2
(45) Date of Patent: Dec. 4, 2018

(54) EFFICIENT DISTRIBUTED NETWORK IMAGING OF INSTANT LOTTERY TICKETS

(71) Applicant: Hydra Management LLC, New York, NY (US)

(72) Inventors: Allen Lorne Weil, New York, NY (US); Fred W. Finnerty, Dawsonville, GA (US); George Kurtz Peng, Brooklyn, NY (US)

(73) Assignee: Hydra Management LLC, New York, NY (US)

( * ) Notice: Subject to any disclaimer, the term of this patent is extended or adjusted under 35 U.S.C. 154(b) by 134 days.

(21) Appl. No.: 15/416,667

(22) Filed: Jan. 26, 2017

(65) Prior Publication Data

US 2017/0213425 A1 Jul. 27, 2017

Related U.S. Application Data

(60) Provisional application No. 62/287,051, filed on Jan. 26, 2016.

(51) Int. Cl.

| | |
|---|---|
| ***G06F 15/00*** | (2006.01) |
| ***G07F 17/42*** | (2006.01) |
| ***B41F 1/16*** | (2006.01) |
| ***B41F 1/20*** | (2006.01) |
| ***B41F 1/22*** | (2006.01) |
| ***B41F 19/00*** | (2006.01) |

(Continued)

(52) U.S. Cl.

CPC ............ *G07F 17/42* (2013.01); *A63F 3/0655* (2013.01); *B41F 1/16* (2013.01); *B41F 1/20* (2013.01); *B41F 1/22* (2013.01); *B41F 19/007* (2013.01); *B41J 2/04* (2013.01); *B41J 11/002* (2013.01); *B41J 29/393* (2013.01); *B41M 1/04* (2013.01); *B41M 3/008* (2013.01); *B41M 3/14* (2013.01); *G07F 17/329* (2013.01); *G07F 17/3225* (2013.01); *G07F 17/3241* (2013.01); *A63F 3/0665* (2013.01); *B41P 2200/12* (2013.01); *B42D 15/025* (2013.01)

(58) Field of Classification Search

CPC .... G06F 17/42; B41F 1/16; B41F 1/20; B41F 1/22; B41F 19/007; B41J 2/04; B41J 11/002; B41J 29/393

USPC ........................................................ 358/1.15

See application file for complete search history.

(56) References Cited

U.S. PATENT DOCUMENTS

| | | | |
|---|---|---|---|
| 4,540,628 | A | 9/1985 | Oberdeck et al. |
| 4,858,123 | A | 8/1989 | Alexoff et al. |

(Continued)

FOREIGN PATENT DOCUMENTS

| | | | |
|---|---|---|---|
| WO | 2015162533 | A1 | 10/2015 |

OTHER PUBLICATIONS

Int'l Search Report dated Aug. 17, 2017 in Int'l Application No. PCT/US2017/015109.

(Continued)

*Primary Examiner* — Saeid Ebrahimi Dehkordy
(74) *Attorney, Agent, or Firm* — Panitch Schwarze Belisario & Nadel LLP

(57) ABSTRACT

A computer-implemented method and system are provided for enabling digital imaging of both secure and non-secure areas of instant lottery tickets on demand across a geographically diverse network. Instant lottery tickets produced with this system accommodate smaller volume print runs, process color, and a greater level of customization.

8 Claims, 10 Drawing Sheets

(51) Int. Cl.

| | |
|---|---|
| ***B41J 2/04*** | (2006.01) |
| ***B41J 11/00*** | (2006.01) |
| ***B41J 29/393*** | (2006.01) |
| ***B41M 1/04*** | (2006.01) |
| ***B41M 3/00*** | (2006.01) |
| ***B41M 3/14*** | (2006.01) |
| ***G07F 17/32*** | (2006.01) |
| *A63F 3/06* | (2006.01) |
| *B42D 15/02* | (2006.01) |

(56) References Cited

U.S. PATENT DOCUMENTS

| | | | |
|---|---|---|---|
| 5,213,664 | A | 5/1993 | Hansell |
| 5,569,512 | A | 10/1996 | Brawner et al. |
| 5,704,647 | A | 1/1998 | Desbiens |
| 5,772,510 | A | 6/1998 | Roberts |
| 5,935,000 | A | 8/1999 | Sanchez, III et al. |
| 5,949,042 | A | 9/1999 | Dietz, II et al. |
| 6,273,817 | B1 | 8/2001 | Sultan |
| 6,729,656 | B2 | 5/2004 | Kubert et al. |
| 7,248,693 | B1 | 7/2007 | Tretter et al. |
| 7,374,484 | B2 | 5/2008 | Bennett, III |
| 7,665,400 | B2 | 2/2010 | Duke |
| 7,720,421 | B2 | 5/2010 | Snyder |
| 7,788,482 | B2 | 8/2010 | Irwin, Jr. |
| 7,922,178 | B2 | 4/2011 | Finocchio |
| 7,963,437 | B1 | 6/2011 | McBride et al. |
| 8,037,307 | B2 | 10/2011 | Irwin, Jr. |
| 8,043,154 | B2 | 10/2011 | Bennett, III |
| 8,074,570 | B2 | 12/2011 | Grotkowski et al. |
| 8,267,766 | B2 | 9/2012 | Lazar |
| 8,342,576 | B2 | 1/2013 | Eschbach et al. |
| 8,408,986 | B2 | 4/2013 | Irwin, Jr. et al. |
| 8,478,981 | B2 | 7/2013 | Khan et al. |
| 9,405,984 | B2 | 8/2016 | Irwin, Jr. et al. |
| 2004/0127279 | A1 | 7/2004 | Gatto et al. |
| 2006/0279775 | A1 | 12/2006 | Matsumoto et al. |
| 2008/0131176 | A1 | 6/2008 | Snyder |
| 2009/0197661 | A1* | 8/2009 | Frick ........................ G07F 17/32 463/17 |
| 2009/0263583 | A1 | 10/2009 | Mantell et al. |
| 2010/0253063 | A1* | 10/2010 | Skogster ............... A63F 3/0665 283/100 |
| 2012/0267888 | A1 | 10/2012 | Behm et al. |
| 2014/0045568 | A1* | 2/2014 | Bennett, III .......... G07F 17/323 463/17 |
| 2014/0356537 | A1 | 12/2014 | Tyagi et al. |

OTHER PUBLICATIONS

Shannon, "Communication Theory of Secrecy Systems", in Bell Labs Technical Journal, vol. 28, No. 4, pp. 656-715 (1945).

Increasing System Security by Using the DS5250 as a Secure Coprocessor, Maxim Application note 3294, Sep. 2004, Downloaded fromweb page: <https://www.element14.com/community/servlet/JiveServlet/previewBody/17212-102-2-53335/AN3294.pdf>, Download date: Dec. 2017, 6 pages.

Hardware random number generator; Wikipedia, Jun. 2014, Downloaded from web page: <https://en.wikipedia.org/wiki/Hardware_random_number_generator> Download date: Dec. 2017, 8 pages.

* cited by examiner

EFFICIENT DISTRIBUTED NETWORK IMAGING OF INSTANT LOTTERY TICKETS

CROSS-REFERENCE TO RELATED APPLICATION

This application claims the benefit of U.S. Patent Application No. 62/287,051, filed Jan. 26, 2016, the disclosure of which is hereby incorporated herein by reference in its entirety.

FIELD OF THE INVENTION

The present invention relates generally to lottery tickets, having variable indicia which indicates win or lose information for the tickets under a Scratch-Off Coating (SOC), and more particularly to methods of economically imaging the lottery tickets over a geographically diverse network. Specifically, this innovation achieves economies and efficiencies in the manufacturing, distribution, and sales of instant lottery tickets previously not attainable. With this innovation, instant lottery tickets can be economically produced in smaller volumes over multiple digital printers that may be geographically separated, thereby enabling production of new types of specific or targeted games that sell to an expanded demographic base and market.

BACKGROUND

Instant (scratch-off) lottery games have become a time honored method of raising revenue for state and federal governments the world over. Traditional scratch-off and draw games have evolved over decades, supplying increasing revenue year after year. However, after decades of growth, the sales curves associated with traditional games seem to be flattening out with median sales per capita experiencing a decline. This flattening of lottery sales growth is typically attributed to a fixed base of consumers that routinely purchase lottery products with very few new consumers choosing to participate in the lottery marketplace. Various analyses of state lottery sales data tend to support the hypothesis that lotteries rely heavily on an existing consumer base and more specifically on lottery "super users." Three states (Rhode Island, South Dakota and Massachusetts) had 2014 lottery sales that topped $700 per capita. While ten states had per capita sales below $100, per capita sales. All combined, state lotteries averaged almost $250 per capita in sales. Demographically speaking, this existing base of lottery consumers is aging, with younger consumers showing very little interest in participating in existing lottery offerings. Thus, the growth potentials for ever-increasing lottery sales are increasingly challenged by the saturation of the existing fixed base of consumers. Consequently, both lotteries and their service providers are presently searching for more marketable forms of gaming that would appeal to a broader consumer base.

In addition to flattening sales, a static lottery consumer base is often cited when state legislatures debate whether lotteries represent a form of exploitation of problem gamblers. For example, "Stop Predatory Gambling", which advocates an end to state-sponsored gambling recently stated, "State lotteries have a business model that's based on getting up to 70 to 80 percent of their revenue from 10 percent of the people that use the lottery . . . ." In Minnesota, a pending bipartisan bill would require 25% of lottery billboards to be dedicated to a warning about the odds of winning and gambling addiction, as well as information on where problem gamblers can seek help.

This phenomenon of a relatively small percentage of the population responsible for a large majority of lottery sales is partially due to the commoditization of lottery tickets by ticket manufacturers. In the past decade, manufacturers of instant lottery tickets have developed techniques which enabled fixed plate produced color images to be printed as display and on top of (i.e., overprinted on) the scratch-off layers. Using this conventional printing method, the display and overprint images are stationary and do not change from one printing impression to the next during a single printing run—see e.g., U.S. Pat. Nos. 5,569,512 and 5,704,647. This, in turn, confines the instant lottery ticket product to high-volume print runs with very little experimentation in terms of theming and gaming experience due to the need to ensure that the vast majority of print runs sell out to ensure economic feasibility. Therefore, these high-volume print runs tend to be themed around well-established concepts that have been developed over years principally designed to accommodate "super users."

Lottery ticket production involves variable information or variable indicia when designing the play styles and prize payout functions of the games; it is impractical to meet these requirements using conventional plate printing techniques such as flexographic to produce game play and validation information in the security areas hidden by the SOC of tickets. Far too many plate changes would be required to produce the vast amount of variable indicia in the security areas to complete a run that consisted of large volumes of tickets, rendering plate printing for this purpose not viable. Thus, to date, almost all lottery ticket variability has been confined to monochromatic variable indicia or two-spot color indicia imaged by drop-on-demand ink jet printers with the display and overprints portions being printed with fixed plates and therefore, mostly static from game to game.

While there has been some industry effort to advance instant lottery ticket printing technology with full color digital imaging (most notably: U.S. Pat. Nos. 7,720,421; 8,074,570; 8,342,576; and patent application publication Nos. US 2009/0263583; US 2010/0253063; US 2012/0267888; and US 2014/0356537); none of this effort has addressed the problem of dealing with printing on demand and distributed network printing of relatively small stylized print runs specifically targeted at differing demographics.

In an attempt to de-commoditize lottery tickets, appeal to a broader base, and increase sales, United States lotteries have moved towards producing games with more entertainment value that can be sold at a premium price. Ideally, these games would include process color indicia, display, and overprint imaging and should be economically produced in smaller volumes, thereby allowing for game experimentation and targeting of different demographic groups other than core players. However, as described above, lottery ticket manufacturers have developed infrastructures that primarily support large volume fixed plate display and overprint printing with monochromatic variable indicia produced at a small number of large print facilities.

For example, ten-dollar instant ticket games with higher paybacks and more ways to win now account for over $5 billion a year in United States lottery sales. But, limited by the fixed plate and high-volume restrictions enforced by current manufacturing techniques and practices, these higher priced instant games are still generic in nature and consequently are a minor percentage of overall game offerings with limited potential for assisting in consumer base diversification. In other words, the high-priced and high-volume nature of these games tends to drive the lotteries to generic, proven, type of play (i.e., appealing to existing player base) with very little experimentation and unique entertainment value relative to lower-priced instant tickets and consequently, does not attract many new consumers.

Moreover, as gaming technology and systems continue to evolve and become more sophisticated, numerous new types of games and products become available that tend to distance themselves from the one-size-fits-all and large-volume instant lottery ticket paradigm that has sustained the industry for decades. These gaming trends no longer support gaming to the masses; rather, differentiation through information is favored, with games tracking and targeting such concepts as: predictive value, frequency, average bet, product identification, small targeted audiences, etc. However, tracking and targeting games to these concepts necessitates segmenting the player base into smaller and smaller groups or pools with each group or pool too small to sustain large volume games by itself. Additionally, by concentrating lottery printing production in large secure facilities, the logistical challenges of distributing small game runs, in addition to production challenges, causes such games to be priced uneconomically such that they still resemble the standard instant ticket lottery product. Also, centralized production of large print runs inherently prohibits game spontaneity—e.g., seasonal tickets, greeting cards, collector cards, lottery tickets for specific chain stores, bowl game commemorative instant tickets celebrating the winning team in their home state, local high schools, etc.

Thus, it is highly desirable to develop instant ticket manufacturing techniques with more variable and dynamic appeal that provides methods of offering new gaming opportunities, particularly more customized and consequently smaller volume games. Ideally, these games should be printed over a distributed network, thereby enabling efficiencies in distribution as well as spontaneity. The present invention achieves these goals.

SUMMARY OF THE INVENTION

Objects and advantages of the invention will be set forth in part in the following description, or may be apparent from this description, or may be learned through practice of the invention.

Methodologies are set forth to ensure economies and efficiencies in the manufacturing, distribution, and sales of instant lottery tickets using modern process color digital imagers. These methodologies enable economic instant lottery ticket printing on demand, in small volumes, and distributed across multiple entities and locations, thereby enabling production of new types of specific or targeted games that sell to an expanded demographic base and market.

Prior to this invention, economic production of low volume lottery instant tickets with the capabilities to print on demand as well as over a distributed network has not been possible. This invention also reduces the inherent waste associated with large volume instant lottery ticket production by breaking large production runs into multiplicities of smaller print runs printed when needed, thereby eliminating large quantities of unsold tickets that ultimately must be destroyed when a game becomes unpopular. This reduction in unsold waste also enables higher top tier prizes to be offered more frequently with instant lottery games, since if a standard instant lottery game only offers one high top prize (e.g., $1,000,000), sales for that game taper off rapidly once it is known by the public that the top prize has been won.

Distributed networks solve a multitude of problems associated with selling instant lottery tickets. Perhaps the greatest advantage is "in jurisdiction," "in state," and "in country" printings, thereby enabling spontaneity, local job creation, partial print run production, and just in time delivery. However, while previously unknown locality production is highly desirable, it is also essential that the production data be derived from a "trusted source." Trust is the cornerstone of any lottery. By creating a centralized generation system, certified and monitored by multiple lottery organizations, that is networked to multiplicities of super-mini instant ticket printing facilities, the risk of corruption is virtually eliminated. Networked printing systems offer transparency and security to the process heretofore unattainable.

Many jurisdictions have the desire for "in jurisdiction" manufacturing. By locating the printing facility within a local jurisdiction, while keeping the expertise work centralized, local manufacturing is possible, while producing a secure product. By placing the printing operation within a secure warehouse facility, packaging and distribution can be greatly reduced with a print on demand model. Regional pride of a simple printed statement "PRINTED IN __________" will enhance customer relations and possibly increase sales.

From time to time, some countries have been known to experience hyperinflation, such as Brazil 1986-1995, which experienced over 5,000% inflation during that time period. With such inflation, a $1.00 ticket can change virtually overnight to effectively a 1¢ ticket. Because of the high print volume and low speed of maritime and trucking transport, and in most instances due to weight and volume, air transport is prohibitively expensive for lottery instant ticket products, rapid response to such monetary devaluations is almost impossible using existing instant ticket printing "big bang" technology. With local printing equipment, transportation time can be reduced or eliminated. Furthermore, with the replacement of fixed printing plates with digital imaging, the art and symbols of a game can be changed with minimal cost with tickets printed in relative small volumes, as currency value dictates.

Distributed instant ticket printing networks also allow for game generation to be separate from game development. This allows game development (e.g., planning, programming, auditing, etc.) to be executed at a primary location with physically printing an instant ticket game entirely within remote jurisdiction(s). In some jurisdictions, localized printing could be a requirement to comply with jurisdictional gaming laws. Aside from the potential needs for specialty security devices, the game generation system would run with common off-the-shelf hardware, which may also be a jurisdictional requirement.

In a first embodiment, super-mini instant ticket lottery imager press lines are disclosed that are capable of supporting printing of customized instant lottery tickets over small print runs. These instant ticket lottery imager press lines also enable printing of instant lottery tickets over a geographically diverse network.

In another embodiment, the instant lottery ticket production network is disclosed with geographical diversity achieved with multiplicities of smaller printing facilities. This embodiment has the primary advantage of reducing costs and time typically incurred by shipping vast quantities of instant lottery tickets over long distances. Instant tickets shipping has high costs due to the very high weight inherent in shipping tightly packed paper products—e.g., a relatively small print run of 10 million 2 inch (5.1 cm)×4 inch (10.2 cm) 10-point tickets would weigh approximately 14 tons (~12,700 kg), a run of 10 million 6 inch (15.2 cm)×4 inch (10.2 cm) 10-point tickets would weigh approximately 42 tons (~38,100 kg).

In another embodiment, the game server is located in a cloud type data center with the physical printing and game generation executed at other facilities. Among other advantages, this embodiment has the advantage of potentially increased security and reliability at lower operations costs.

In still another embodiment, the disclosed instant lottery ticket production network is leveraged to produce smaller print runs (e.g., 1,000 to 1,000,000 tickets) locally on demand. This embodiment has several advantages in terms of efficiencies as well as spontaneity.

In another embodiment, the super-mini instant ticket lottery imager press lines are wholly contained in a mobile enclosure. The mobile enclosure can be networked to the game server over mobile communications links such as satellite. The mobile enclosure having the obvious advantage of portability, thereby allowing periodic "local" ticket production in jurisdictions that are not large enough to justify the costs of an installed super-mini instant ticket lottery imager press line—e.g., South Dakota Lottery, North Dakota Lottery, Wyoming Lottery.

Described are a number of computing mechanisms that provide practical details for reliably producing secure instant lottery tickets in process or spot colors, on demand, and across multiple locations via a network. Although the examples provided herein are primarily related to lottery instant tickets, it is clear that the same methods are applicable to any type of secure document with indicia hidden by a SOC. Therefore, as used herein, "ticket" or "instant lottery ticket" means lottery tickets and any other type of security-enhanced documents using a SOC.

Various embodiments of the present invention relate to the following aspects:

1. A super-mini digital imager instant ticket printing line for producing Scratch-Off Coating (SOC) secured documents having a SOC covering variable indicia, wherein the variable indicia are unreadable so long as the SOC remains intact, comprising:

an accepting area for web paper stock having front and back surfaces, with pre-applied lower security ink films on at least one side of the web paper stock;

at least two full-color digital imagers configured to print on the front and back surfaces of the web paper stock;

a first applicator for applying at least one transparent or translucent release coating on at least a portion of the variable indicia and optionally on at least a portion of the display;

a second applicator for applying at least one upper opacity coating on the at least one transparent or translucent release coating; and a third applicator for applying at least one upper white SOC security layer on the at least one upper opacity coating;

wherein the super-mini digital imager instant ticket printing line receives digital imaging input via a secure network connection from a central site game programming facility, such that the super-mini digital imager instant ticket printing line can be located in a different geographical location than the central site game programming facility.

2. The super-mini digital imager instant ticket printing line of aspect 1, further comprising a fourth applicator for applying full color overprint imager ink on top of the upper white SOC security layer.

3. The super-mini digital imager instant ticket printing line of aspect 2, wherein the fourth applicator is a full-color digital imager.

4. The super-mini digital imager instant ticket printing line of aspect 1, wherein the first applicator is a digital imager.

5. The super-mini digital imager instant ticket printing line of aspect 1, further comprising a curing station for curing the at least one transparent or translucent release coating via direct energy.

6. The super-mini digital imager instant ticket printing line of aspect 5, wherein the direct energy is Ultraviolet (UV) light.

7. The super-mini digital imager instant ticket printing line of aspect 5, wherein the direct energy is electron beam.

8. The super-mini digital imager instant ticket printing line of aspect 1, wherein the second applicator is a digital imager.

9. The super-mini digital imager instant ticket printing line of aspect 1, further comprising a curing station for curing the at least one upper white SOC security layer via at least one of convection heat and Infrared (IR) heat.

10. The super-mini digital imager instant ticket printing line of aspect 1, wherein the third applicator is a digital imager.

11. The super-mini digital imager instant ticket printing line of aspect 1, for printing smaller print runs of less than 10 million tickets.

12. The super-mini digital imager instant ticket printing line of aspect 1, for printing smaller print runs of less than 3 million tickets.

13. The super-mini digital imager instant ticket printing line of aspect 1, wherein the digital imagers print with dye.

14. The super-mini digital imager instant ticket printing line of aspect 1, wherein the digital imagers printed with pigmented ink.

15. The super-mini digital imager instant ticket printing line of aspect 1, wherein the third applicator is a digital imager for applying at least a portion of the at least one upper white SOC security layer with pigmented ink.

16. The super-mini digital imager instant ticket printing line of claim 1, wherein an initial applicator separate from the printing line pre-applies the lower security ink films to the web paper stock.

17. The super-mini digital imager instant ticket printing line of aspect 16, wherein the initial applicator separate from the printing line pre-applies the lower security ink films to the web paper stock as a series of flood coatings.

18. A network interfaced game server that provides instant ticket production data for games defined by a plurality of tickets with variable indicia hidden by a scratch-off coating, the game server being associated with production of tickets, the production of tickets comprising (i) game server access via the Internet, (ii) shuffling or assignment of prizes to individual tickets, (iii) secure interfaces to at least one super-mini digital press, and (iv) secure interfaces to other users, wherein the game server comprises:

(a) a first random number generator that provides shuffle seeds to randomize a deal of tickets via (i) internally generated random or pseudorandom numbers, or (ii) accepting random or pseudorandom numbers from an authenticated and authorized outside source; and (b) accessing audit for authorized users, via the Internet interface; and (c) providing multilayer security between the actual game server and the Internet interface, wherein support is provided to various geographically distinct users.

19. The networked game server of aspect 18, wherein the game server is physically located within a cloud based secure data center.

20. The networked game server of aspect 18, wherein access control lists restrict game server access from at least one device external to the game server.

21. The networked game server of aspect 18, wherein separate virtual private network tunnels are established for each user after authentication from at least one device external to the game server.

22. The networked game server of aspect 21, wherein the virtual private network tunnel interface is established after successful hash based message authentication code exchange using a priori encryption keys.

23. The networked game server of aspect 18, wherein context-based access control protocol restricts game server access from at least one device external to the game server.

24. The networked game server of aspect 18, wherein user unique individual security sandboxes are established for each user on the game server during application level authentication on the game server.

25. The networked game server of aspect 24, wherein applet access to resources outside the user unique individual security sandboxes are managed by an object request broker on the game server.

26. The networked game server of aspect 18, wherein at least one separate hardware firewall performs stateful inspection of incoming cleartext data streams between a demilitarized zone and the game server.

27. The networked game server of aspect 18, wherein at least one separate hardware intrusion protection system or intrusion detection system performs security inspection of incoming cleartext data streams in a demilitarized zone.

28. An instant ticket networked production method for just in time production of instant tickets for games defined by a plurality of tickets with variable indicia imaging data hidden by a Scratch-Off Coating (SOC) using a networked production system, the networked production method comprising:

(a) shuffling or assigning prizes to individual tickets conducted by the networked game server within a secure facility;

(b) generating the imaging data from the shuffled instant tickets and converting the imaging data into ciphertext;

(c) remotely transmitting the programming and game generation ciphertext imaging data to the networked game server;

(d) providing external audit access to the game server;

(e) providing secure interfaces to at least one super-mini digital press, such that the imaging data can be downloaded on demand;

(f) remotely downloading the imaging data ciphertext from the game server;

(g) decrypting the downloaded programming and game generation ciphertext local to the super-mini digital press thereby converting the ciphertext imaging data from the game server to cleartext suitable for printing;

(h) transferring production data from at least one super-mini digital press to the remote game server in a secure facility for generation of ship and validation files; and (i) performing data or file segmentation, thereby partitioning the imaging data into discrete pools or packets enabling downloading of individual pools or packets to different printing facilities on demand;

wherein printing economies for the instant tickets are realized via just in time instant ticket production.

29. The instant ticket networked production method of aspect 28, wherein production data transferred remotely from at least one super-mini digital press is used to generate a stolen pack file.

30. The instant ticket networked production method of aspect 28, wherein at least two super-mini digital presses are located in different geographical areas from each other.

31. The instant ticket networked production method of aspect 28, wherein at least two super-mini digital presses print separate discrete portions of a same game.

32. The instant ticket networked production method of aspect 28, wherein a same game is printed in multiple portions at different times.

33. The instant ticket networked production method of aspect 28, wherein game server access is available over the Internet.

34. The instant ticket networked production method of aspect 33, wherein two or more remote super-mini digital presses are granted limited access to the game server.

35. The instant ticket networked production method of aspect 33, wherein non-production personnel are granted limited access to the game server.

DETAILED DESCRIPTION

Figure 1:
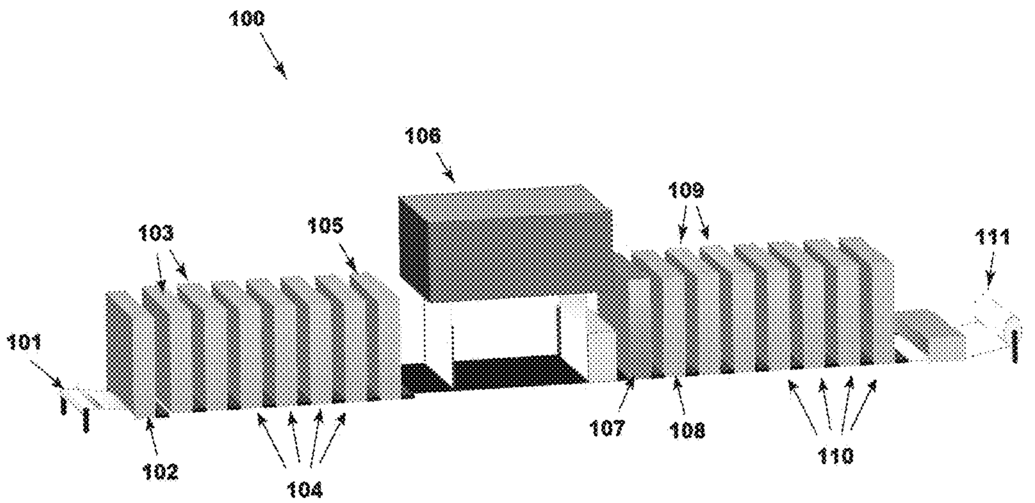
FIG. 1 (Prior Art)
FIG. 1 is an exemplary schematic front isometric view of a typical, prior art, instant lottery fixed plate printing press line capable of producing traditional instant lottery tickets.

In the context of this invention "secure" portions of lottery tickets or other documents refer to variable indicia that are hidden under a Scratch-Off Coating (SOC) until the ticket or document is played. "Non-secure" portions of lottery tickets or other documents refer to areas that are visible while the ticket or document is in a pristine condition—i.e., not scratched or played. Examples of "non-secure" areas would include a ticket or document's display, overprint, or backing. Also, throughout this description, the terms "process color" and "four-color" imaging are used interchangeably. In the context of this invention, the term "four-color" imaging refers to a specific subset of "process color" imaging—i.e., Cyan, Magenta, Yellow, and blacK (CMYK). As used herein, the term "white" with respect to the white SOC security layer or any other layer means a layer white in color or other light color onto which a subsequent display, overprint or other layer with various types of indicia can be clearly discerned. Finally, in the context of this invention, the term "super mini" refers to any configuration of digital imager network-enabled printing presses capable of printing SOC secured documents—e.g., see disclosures as embodied in FIGS. 2, 4, and 5. These "super mini" presses are of comparatively small size and cost relative to the non-network-enabled prior art presses (e.g., FIG. 1) also capable of printing SOC secured documents. While most "super mini" presses, as disclosed herein, are of a hybrid type employing a combination of digital imagers (typically for imaging indicia, display, backing, and overprints) and fixed plate printing stations used for various security coatings (e.g., FIGS. 2 and 4) the term "super mini" can also refer to a printing press with only digital imaging included (e.g., FIG. 5).

Producing and ensuring the security of on-demand instant ticket print runs across networked printing locations in an economically viable fashion requires segmentation, synchronized release of information, and coordination. By maintaining all game generation functionality in a central, secure, server system, the physical printing process being conducted primarily by digital imagers need not be located in the same facility with the central server system, but can be distributed over a geographically diverse network, so that new economies can be achieved both in terms of monetary costs and time to delivery, that were previously not possible.

Part of these economies arise from pushing all major digital security requirements up to the central site server system, with, other economies (particularly delivery speed) achieved via the optional geographically diverse printing network, thereby, enabling production of lottery products within a given lottery's jurisdiction. Other economies arise from incorporating digital process color imagers instead of fixed plate printing for the majority if not all of the ticket's variable indicia, display, overprint, and, backing. By eliminating fixed plate printing for all or almost all of the ticket's variable indicia, display, overprint, and backing, great efficiencies are achieved in terms of press setup, press size, press cost, and ticket customization. While present technology digital process color imagers may not operate with web speeds (e.g., 100-500 FPM—Feet Per Minute; ≈31 to ≈152 MPM—Meters Per Minute) as fast as fixed plate systems (e.g., 600-1,000 FPM; ≈183 to ≈305 MPM), the efficiencies achieved by a distributed network of process color imagers in terms of setup, size, and press costs allow such systems to produce instant lottery tickets with a competitive cost advantage for press runs well into the millions of tickets. This shifting of the lottery instant ticket production paradigm from large "big bang" print runs of at least ten million tickets to smaller print runs enabled by the distributed networks of digital super-mini process color imagers in turn enables production of new types of lottery instant tickets targeted at groups other than "super users," thereby expanding the lottery marketplace.

Reference will now be made to one or more embodiments of the system and methodology of the invention as illustrated in the figures. It should be appreciated that each embodiment is presented by way of explanation of aspects of the invention, and is not meant as a limitation of the invention. For example, features illustrated or described as part of one embodiment may be used with another embodiment to yield still a further embodiment. It is intended that the invention include these and other modifications that come within the scope and spirit of the invention.

Before describing the present invention, it may be useful to first provide a brief description of the current state of the art of instant ticket production and printing to ensure that a common lexicon is established of existing systems prior to disclosing the present invention. This description of the current state of the art of instant ticket press is provided in the discussions of FIG. 1 with the prior art distribution network provided in the discussions FIG. 6.

FIG. 1 depicts an exemplary front isometric view of a typical fixed plate hybrid printing press line 100 as currently utilized for the printing of instant lottery instant tickets. This hybrid press is typically comprised of fixed plate flexographic stations 102 through 105 and 107 through 110 inline with monochromatic drop on demand inkjet imager(s) 106 for printing the variable indicia. Alternatively, the hybrid press may also include offset plate printing for the process color stations 104 and 110 combined with flexographic stations for the security ink applications—offset press stations typically not being suitable for security ink applications due to the relatively thin ink film layer printed by the plate offset process. Of course, as would be apparent to one skilled in the art based on this disclosure, other hybrid press configurations are also possible—e.g., gravure stations for the security coatings.

In FIG. 1, paper is supplied to the printing line via web feed 101 being pulled into a first fixed plate printing unit 102 that typically prints a lower opacity layer ink film confined to what will be the scratch-off area. This lower opacity layer ink film is typically confined to only the scratch-off area since it is normally primarily composed of carbon with subsequent ink films applied on top of the opacity ink film consequently appearing dark or gray due to the darkness of the opacity layer. After the lower opacity layer application, one or two impressions of a white or light color overprint are applied by print units 103 to create a higher contrast background for the monochromatic digitally imaged indicia. After the contrasting ink film(s) layer(s) are applied, CMYK (Cyan, Magenta, Yellow, and blacK) typically are applied by the four print stations 104 for the ticket display areas, as well as optional Benday patterns (i.e., wavy variable security patterns designed to make cut and pasting of variable or other indicia from one ticket to another difficult). Next, the web is flipped (not shown in FIG. 1) and print station 105 prints the ticket back display, typically with a monochromatic fixed plate. The web is normally flipped again and routed at this point to front and back variable monochromatic digital imagers 106 for imaging of the variable indicia and inventory control barcodes. After the variable indicia are imaged, a fixed plate print station 107 normally prints a release ink film or layer over the scratch-off area. The release ink film forms a hard surface that protects the variable indicia from damage caused by scratching, as well as enables any subsequent ink film to scratch off. Next, print station 108 applies an upper opacity ink film over the release layer to provide additional protection against candling as well as fluorescence of the variable indicia. Similar to the lower security ink films, one or two impressions of a white or light color SOC overprint are applied by print station 109 to create a higher contrast background for the overprints. Finally, four-color CMYK or spot color screened plates of print station 110 apply the overprint to the scratch-off area with the resulting web of lottery tickets accumulated in a take-up reel 111.

This classic instant lottery ticket printing press line 100 has been developed over decades and is designed for efficiencies of costs for very large print runs (e.g., 10 million to 500 million tickets) where the high start-up and press costs can be amortized over a large number of tickets. Consequently, these classic instant lottery ticket press lines 100 are large in size and costs and tend to be collocated in a few large secure facilities with game programming servers. Another effect of the classic press line 100 is that the high volume print runs necessary to amortize costs limit creativity and customization of lottery ticket game design, as well as require significant lag time for the production and distribution of tickets from the production facilities to the lottery jurisdictions. When it is realized that large print runs of tickets inherently have significant weight—e.g., 100 million 2 inch (5.1 cm)×4 inch (10.2 cm)—10-point tickets would weigh approximately 139 tons or around 126,100 kg), it can be readily appreciated that express shipping of such hefty loads would carry a prohibitively high cost.

Figure 2:
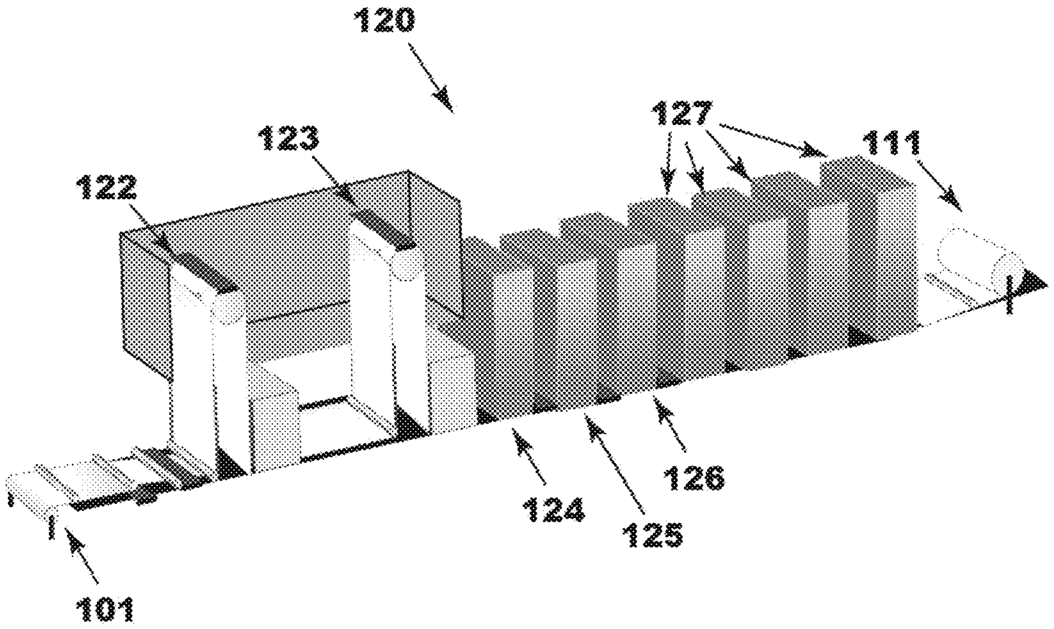
FIG. 2 is a schematic front isometric view of one embodiment of a super-mini digital imager instant ticket printing line capable of producing both traditional and targeted small-run instant lottery tickets.

In comparison to traditional prior art production, FIG. 2 is a front isometric view of an embodiment of a super-mini digital imager instant ticket printing line 120 according to this invention capable of being networked across diverse geographical areas. In the embodiment of FIG. 2, paper is supplied to the printing line via a web feed 101 being pulled into a first digital imager 122 where the tickets' secure variable indicia portion is printed. Secure printing of the variable indicia portion directly on the web is possible if the web feed paper is of a secure stock (e.g., foil, opacity paper) or was pretreated if opacity and optional chemical barriers are pre-applied.

Both the tickets' secure variable indicia portion and display portion could be imaged simultaneously by the first digital imager 122. A second digital imager 123 then receives the web from the first digital imager 122 and prints the ticket back. After the second digital imager 123, a series of inline fixed plate (e.g., flexographic) printing stations apply a release coating by print station 124 (enabling subsequent coatings to scratch off and the underlying variable indicia to be visible, such as a transparent or translucent release layer), at least one opacity coating by print station 125, a white SOC by print station 126, and four (CMYK) process colors by print stations 127. Finally, a web take-up reel 111 then collects the printed ticket stock for further processing by a packaging line. If both the tickets' secure variable indicia portion and display portions were imaged simultaneously by the first digital imager 122, then the fixed plate process color print stations 127 would only print the overprint. Alternatively, the fixed plate process color print stations 127 could image the overprint as well as the display.

In the embodiment of FIG. 2, the upper security ink film applications of print stations 125 and 126 may be preferably applied with a flood coating method, wherein the entire surface of the web substrate is coated with the ink film layers. This embodiment has the advantage of reducing registration requirements, as well as make ready or setup times by eliminating the need to swap printing plates from one game print run to another by making the upper security coatings generic from game to game. However, flood coating would mandate that both the tickets' display and overprints be printed by the four (CMYK) process color printers 127.

As illustrated in FIG. 2, the super-mini digital imager instant ticket printing line 120 images variable indicia and/or display directly on the web as it unrolls from the feeder 101. This is possible only if the lower security functionality (e.g., opacity, diffusion barrier, etc.) is either applied by an offline process or maintained by the characteristics of the substrate itself. Examples of suitable paper substrate would be: foil-laminated card stock with a white aqueous ink film applied to the foil surface (e.g., U.S. Pat. No. 4,540,628—"Oberdeck" et. al.), or dark core opaque substrates resisting delamination (e.g., U.S. Pat. No. 5,213,664—"Hansell" et. al.).

Figure 3:
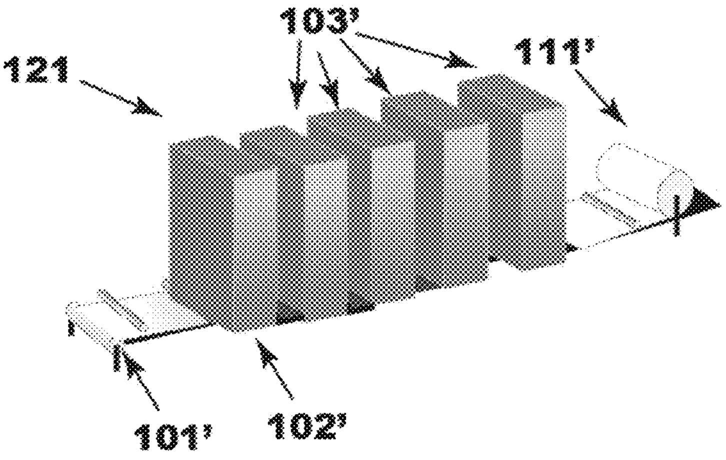
FIG. 3 is a schematic front isometric view of one embodiment of a printing line for efficiently applying lower security layers to a web substrate in support of the embodiment of FIG. 2.

An example of an embodiment of a suitable offline security ink film applicator 121 is provided in FIG. 3. In the embodiment of FIG. 3, paper is supplied to the printing line via web feed 101' being pulled into a first fixed plate printing unit 102' that prints a lower opacity layer ink film flood coated across the entire paper substrate. By flood-coating the opacity ink film across the entire substrate's surface the ink film applicator 121 avoids complexities and waste associated with press registration. More specifically, by flood coating the opacity ink film across the entire substrate's surface, the opacity security layer becomes generic for any ticket layout, since the opacity layer is no longer confined to the scratch-off area exclusively. However, this generic flood coating of a dark opacity layer necessitates sufficient flood coating applications by print stations 103' of a white or light color overprints also applied across the entire substrate's surface to create a generic solid high contrast background for the digitally imaged variable indicia. Thus, multiple fixed plate printing stations 103' (four, for example, illustrated in FIG. 3) may be required to achieve a sufficiently white or light color, homogeneous, high-contrast surface before the finished lower security prepared web is rolled in take-up reel 111'. In a preferred embodiment, the white or light color overprint print stations 103' utilize the gravure printing process, thereby applying a thicker, more opaque ink film than flexographic or offset. The extra costs of gravure cylinders are balanced by the generic full flood application (i.e., same cylinder for all print runs) and the substantially higher longevity of gravure cylinders than other plate processes.

The exemplary prior art fixed plate hybrid printing press line 100 as currently utilized for the printing of lottery instant tickets (FIG. 1) typically eschews pretreating the substrate in a manner enabled by the ink film applicator embodiment 121 of FIG. 3, principally due to its large expected instant lottery ticket print volumes of 10 million to 500 million tickets per print run and high press speeds—e.g., 600 to 1,000 FPM (≈183 to ≈305 MPM). The amount of substrate needed to print this volume of tickets makes the associated labor costs of loading and unloading multiple web rolls prohibitively high. However, with the lower press speeds and shorter print run sizes associated with the super-mini digital imager instant ticket printing line 120 of FIG. 2, as well as supporting a geographically diverse network of printing lines, the extra labor costs of pretreating substrate becomes negligible. Additionally, the higher press speeds typical of the prior art fixed plate hybrid printing press line 100 makes applying opaque or near opaque white or high contrast ink films on top of a dark lower opacity layer extremely difficult.

Figure 4:
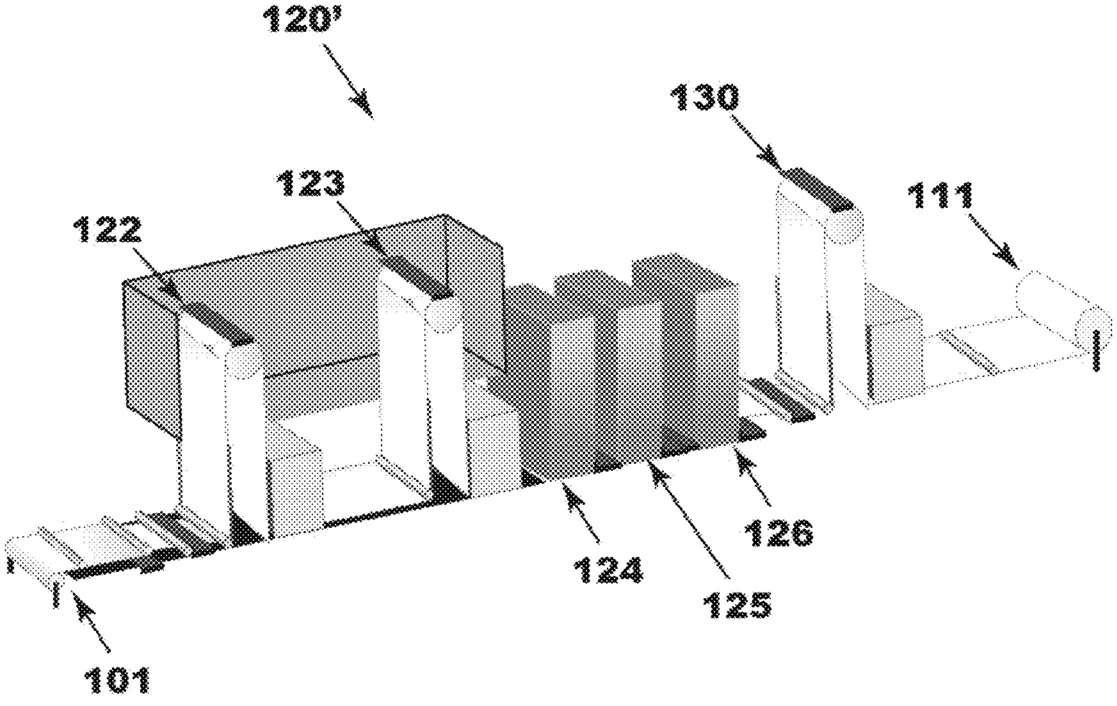
FIG. 4 is a schematic front isometric view of a second alternative of an embodiment of a super-mini digital imager instant ticket printing line capable of producing both traditional and targeted small-run instant lottery tickets.

FIG. 4 depicts another embodiment of a super-mini digital imager instant ticket printing line 120' capable of being placed in network operations. As before, in the embodiment of printing line 120', secure paper is supplied to the printing line via a web feed 101 being pulled into a first digital imager 122 where the tickets' secure variable indicia and optionally non-secure display are printed. Also as before, the second digital imager 123 then receives the web from the first digital imager 122 and prints the ticket back. After the second digital imager 123, an inline fixed-plate printing station 124 applies a release coating with at least one opacity coating applied by print station 125 and at least one white SOC applied by print station 126 with the subsequent CMYK process color overprints applied by a third digital imager 130. As before, a web take-up reel 111 collects the printed ticket stock for further processing by a packaging line. It should be noted that with the embodiment 120', the white SOC would typically include a primer compatible with the ink or dye printed by the imager 130. Depending on the chemistry of the ink applied by the imager 130, a separate print station may be needed to print an additional primer layer e.g., dye based imagers typically require a thicker ink film of primer than pigmented based imagers. If a separate primer print station is utilized, the chemistry of the SOC and possibly the upper opacity layer must necessarily be compatible with the primer's chemistry—e.g., the upper security ink films and the primer all should have an alkaline pH. Due to the typical energy cured (e.g., ultraviolet or electron beam) nature of the release coating resulting in a hardened cured ink film, the chemical compatibility requirements between the release ink film and any added primer are greatly reduced so long as subsequent ink films applied to the release coating scratch-off with the correct amount of resistance.

If both the tickets' secure variable indicia and display were imaged simultaneously by first digital imager 122, then the third digital imager 130 would only image the overprint. Alternatively, the third digital imager 130 could image the display and overprints. The embodiment of the printing line 120' has the advantage of fewer fixed plate printing stations and consequently further reduced make-ready (setup) time and expense when printing game to game.

Figure 5:
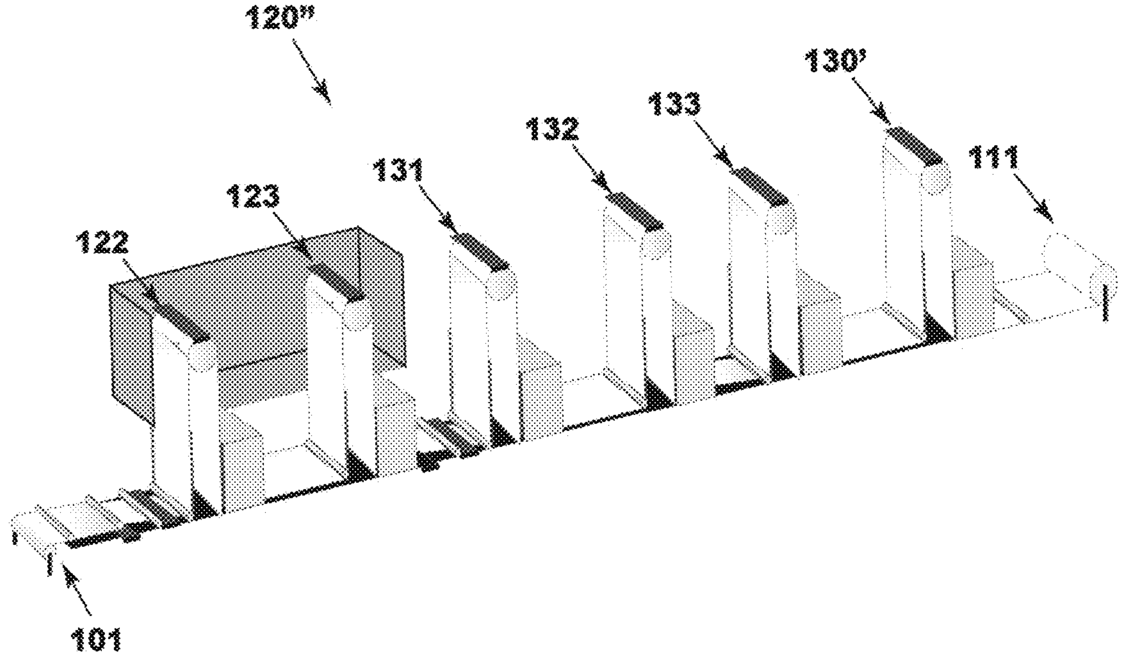
FIG. 5 is a schematic front isometric view of a third alternative of a preferred embodiment of a super-mini digital imager instant ticket printing line capable of producing both traditional and targeted small-run instant lottery tickets.

FIG. 5 depicts another alternative embodiment of a super-mini digital imager instant ticket printing line 120" capable of being placed in network operations according to this invention. As before, in the embodiments of the printing lines 120 and 120', secure paper is supplied to the printing line via the web feed 101 being pulled into a first digital imager 122 where the tickets' secure variable indicia and optionally non-secure display are printed. Also as before, the second digital imager 123 receives the web from the first digital imager 122 printing the ticket back. However, after the second digital imager 123, a third digital imager 131 prints the release coat. The release coat is printed only over the secure variable indicia (i.e., not flood coated) as controlled by the imager 131. In this embodiment, the release coat requires that only pigmented, not dye based, imaging ink or film be printed by imager 131 with the applied release ink film cured via direct energy—i.e., either ultraviolet (UV) or electron beam curing. Pigmented inks differ from dye-based inks in that pigmented inks contain solid particles suspended in a liquid solution, where the entire composition of dye based inks is a liquid solution. The solid particles and energy curing is essential to establish a thick enough release ink film residue to protect the underlying variable indicia from damage from scratching, as well as function as suitable foundation for subsequent ink film layers to be applied that will scratch off.

After the digital imager 131 has printed the release coat, at least one digital imager 132 prints the upper opacity layer over the release coat. Similar to the release coat, the application of the upper opacity layer by the digital imager 132 must be comprised of pigmented ink to ensure sufficient opacity. Though, unlike the release coat, this upper opacity ink film applied by the digital imager 132 must be water based and dried by convection heat and/or infrared (IR) heat, typically leaving a thinner ink film deposit than direct energy curing. This abstention from direct energy curing of the upper opacity ink film (and other upper scratch-off ink films) takes into account at least potential human safety and health concerns—i.e., any ink film that can be scratched-off has the potential to be ingested by a consumer. Direct energy curable inks tend to include toxic chemicals that become benign when fully cured, however the uncertainty of direct energy systems fully curing 100% of the active ingredients in an ink film make such ink formulations potentially unsafe for scratch-off applications. Thus, some opacity may be sacrificed with the imaged upper ink film layer due to the relatively thinner ink film thickness. This reduced upper opacity can be compensated for with higher opacity in the lower security coatings as a countermeasure against candling. Careful selection of variable indicia ink chemistry and composition can also reduce the need for upper opacity against known fluorescence attacks.

Next, at least one imager 133 prints the SOC. Similar to before, the application of the SOC by the digital imager 133 is preferably comprised of pigmented ink to ensure sufficient coverage and is preferably water based and convection and/or IR heat dried. Additionally, the SOC imager 133 may also include a primer compatible with the chemistry of the ink subsequently applied by the CMYK imagers 130'. If the ink applied by the subsequent CMYK imager 130' is dye based, a thicker primer ink film is typically needed and may consequently require another digital imager.

Finally, the last imager 130' prints a full color (CMYK) SOC overprint and optionally the ticket display. As before, a web take-up reel 111 collects the printed ticket stock for further processing by a packaging line. The embodiment 120" has the advantage of no fixed plate printing stations and consequently virtually no make-ready time when printing game to game.

Currently, there are at least three manufacturers of high-resolution web based digital imagers capable of supporting embodiments 120, 120' and 120". Hewlett Packard (HP) Indigo, Memjet waterfall print heads, and Xerox CiPress series are high-resolution color imagers that readily accommodate networked operations. Additionally, the HP, Memjet, and Xerox imagers all accommodate stopping the press line for adjustment and restarting without the need for reregistration of the web imaging. Consequently, the press operators of embodiments 120, 120' and especially 120" will tend to require less training and skill and therefore be available at presumably less expensive labor rates.

When comparing the traditional instant lottery ticket printing press line 100 of FIG. 1 to the FIGS. 2, 4, and 5 embodiments of the super-mini digital imager instant ticket printing lines 120, 120' and 120" capable of functioning in a network, it becomes apparent that the embodiment of the printing line 120 is smaller—typically, around 50 feet (≈15 meters) in length—than the traditional instant lottery ticket printing press line 100 length—typically, around 300 feet (≈91 meters)—of FIG. 1, with embodiments of printing line 120'—FIG. 4; approximately 45 feet (≈14 meters) in length—and printing line 120"—FIG. 5; approximately 40 feet (≈12 meters) in length—being smaller still. These smaller press sizes equate to less cost in terms of equipment, facilities, consumables and utilities, as well as faster press setup times since a significant number of fixed plate printing units have been eliminated, thus the time required to setup each fixed plate printing station, as well as to place the fixed plate printing station in registration with the lees of the press. Additionally, the elimination of a significant number of fixed plate printing units also results in reduction of costs due to the elimination of plate fabrication, as well as the cost reduction due to quicker press setup.

For example, the traditional instant lottery ticket printing press 100 typically consumes around 6,000 linear feet (≈1829 meters) of paper just to register its multiple fixed plate printing stations 102 through 105 and 107 through 110 of FIG. 1. In contrast, the embodiments of the digital imager instant ticket printing lines 120, 120', and 120" offer instant registration for the digital imaging portion with minimal paper usage required for registering the fixed printing stations 124 through 127 of printing line 120 of FIG. 2 and the printing stations 124 through 126 of printing line 120' of FIG. 4 with virtually no additional paper registration required for the presently preferred embodiment of the printing line 120" of FIG. 5.

More specifically, the embodiments of printing lines 120, 120' and 120" (FIG. 2, FIG. 4, and FIG. 5, respectively) have small size, small make-ready (setup) times, and less registration requirements that enable economical production of small print runs (e.g., less than 10 million and preferably less than 3 million) of instant lottery tickets, which enable new forms of game designs, as well as distributed printing over a geographically diverse network. Additionally, the small print runs and distributed printing on demand over a network greatly reduce waste due to the reductions in instant ticket inventories. These reductions in waste can be substantial, thereby offering a significant cost savings to the lotteries and instant ticket printer—e.g., if an instant ticket game is printed with a high top prize (e.g., $1,000,000), once the top prize is won sales for that particular game will drop off rapidly and less tickets will remain unsold and have to be returned to the supplier or destroyed. However, with the invention of digital imager instant ticket printing lines preferably located local to the lottery distribution center, portions of an entire print run can be printed at a time on demand, thereby eliminating the waste associated with "big bang" printing when a particular game becomes unpopular with the public.

As would be apparent to one skilled in the art in view of this description, there are numerous other permutations of super-mini digital imager printing lines (e.g., flexographic stations before the first digital imager, additional flexographic stations between the second and third digital imagers, sheet feed paper, two separate print lines for the lower portions and the upper portions, etc.) that under some circumstances may be alternatives to or preferable to the disclosed embodiments. The significant characteristics of the present invention are that the super-mini digital imager lines utilized must accept local or remote image feeds, support rapid startup with very little make ready (prep) time, accept and process digital imaging from a central server, be relatively small in size, and require minimal skill of the press operators.

Thus, the support for smaller press runs sizes enabled by a network of digital imager printing lines allows for printing on demand over geographically diverse areas. This last statement is significant, for it highlights the potential for new types of targeted instant lottery games that were previously not possible due to the large number of tickets required for a minimum print run (e.g., at least 10 million) and the large size, operational complexity, and costs of traditional hybrid fixed plate and digital imager presses. Additionally, the capability to print on demand over geographically diverse areas creates a lower cost alternative for lottery ticket production. Rather than "big bang" production, where all the tickets for a game are printed at once, printing on demand at various locations allows lotteries to print only the tickets needed for a rollout, ongoing game, promotion, etc., thereby, eliminating waste and warehousing costs. With the invention of smaller, on demand print runs, when the methods of printing tickets in a network across geographically diverse areas are compared to the traditional methods of "big bang" instant ticket production, the efficiencies and the economies gained with networked production become profound.

Figure 6:
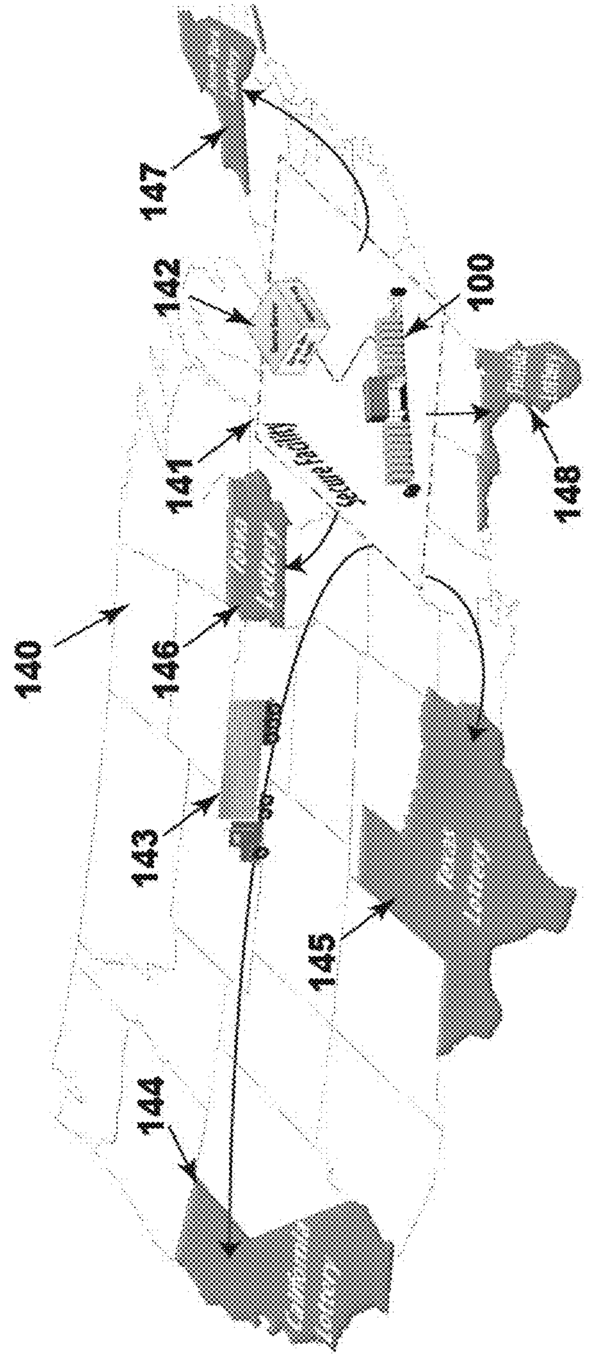
FIG. 6 (Prior Art)
FIG. 6 is an exemplary diagram providing a graphical overview of the prior art typical instant lottery fixed plate printing press "big bang" central production and distribution enabled for tickets produced by the prior art hybrid press line of FIG. 1.

FIG. 6 provides a graphical example of a prior art traditional instant lottery ticket "big bang" production and distribution 140 system for five lotteries 144 through 148 across the continental United States. As shown in FIG. 6, all ticket production typically takes place in a secure facility 141 with game creation 142 (i.e., programming, game generation, audit, and game server) collocated with a large traditional press line 100. While not essential, the collocation of game creation 142 and the traditional press line 100 is typical, since both require the same level of security with the monochromatic 240 dpi imager data usually transferred from the game creation location 142 to the press imagers 106 (FIG. 1) over a secured Local Area Network (LAN).

Returning to FIG. 6, once the physical instant lottery ticket production is completed and the tickets have been packaged, the entire print run of tickets is then transported, usually by truck 143, due to weight, to the lotteries 144 through 148 for warehouse storage and eventual distribution to retailer outlets, usually via private or common carrier. Thus, the existing "big bang" method of instant lottery ticket production and distribution 140 typically requires all tickets to be produced at one time to achieve efficiencies in a large press such as the press line 100, with the resulting printed tickets transported over great distances from the secure production facility 141 to the lotteries 144 through 148. This existing method produces delays due to production and transportation, as well as inefficiencies and hindrance of game design, due to large volumes of tickets produced at the same planned time.

Figure 7:
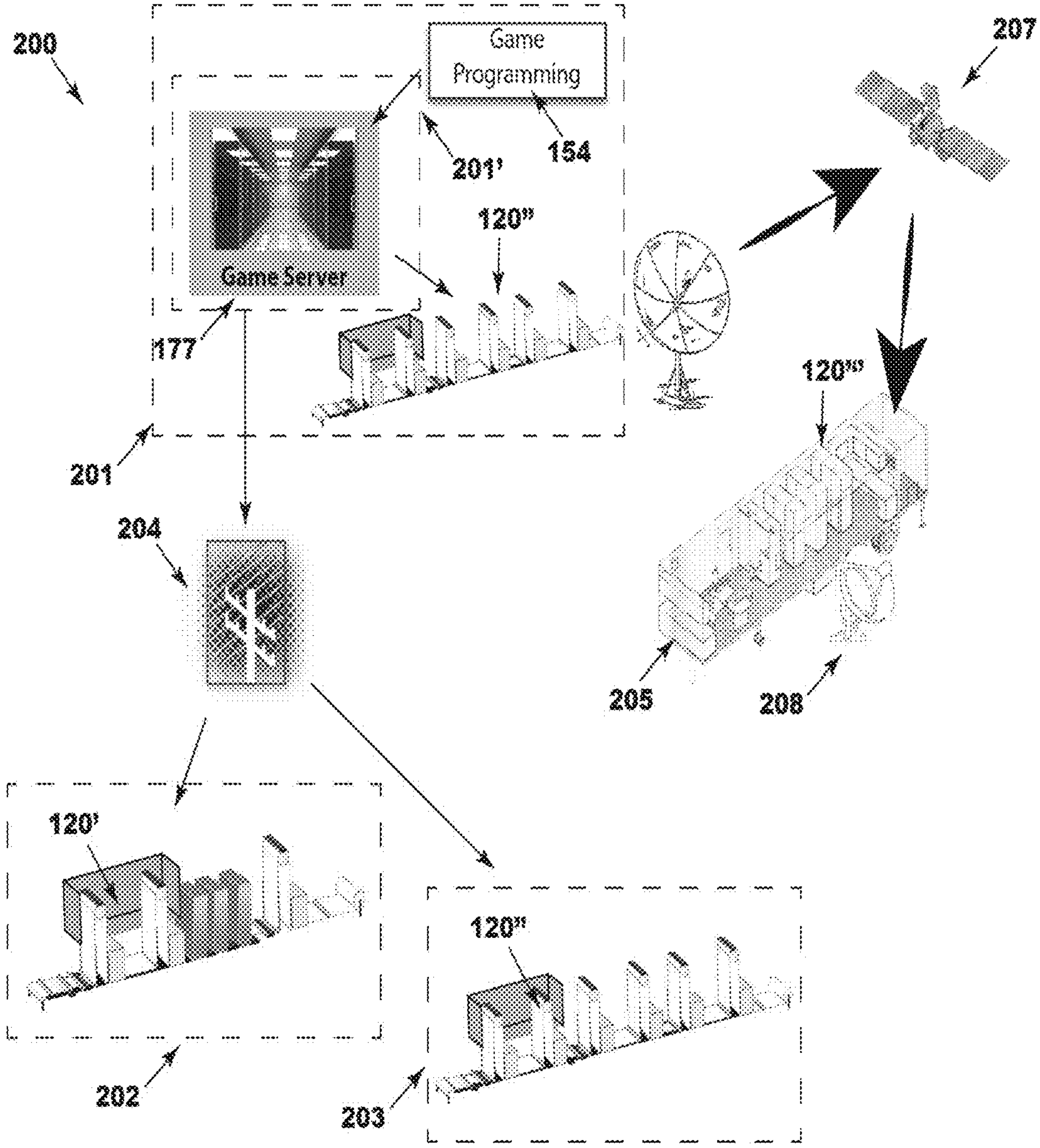
FIG. 7 is a diagram providing a graphical overview of a distributed printing system enabled by the embodiments of FIG. 2 through FIG. 5.

In contrast, the distributed processing network of digital imager printing lines 200 according to the present invention illustrated in FIG. 7 eliminates these inefficiencies and hindrances by producing tickets in smaller lots, on demand, and over a diverse geographical area. In FIG. 7, game programming 154 and the secure game server 177 are illustrated at one geographical location 201 set together with one of the imager lines 120". However, in other embodiments, the secure game server 177 could be located in a separate facility 201' from any printing lines and separate from the location of game programming 154.

In separate fixed geographical locations 202, 203, and mobile locations 205, such as trailers, other imager lines 120', 120", and 120'" (respectively) are available over the distributed network 200 via terrestrial 204 and extraterrestrial 207 methods of communications. In the example of FIG. 7, extraterrestrial communications 207 are achieved via a satellite link 207 with data transmitted from the game server 177 to the mobile receiver 208. In both modes of communications, the transmitted data should be encrypted and encapsulated in a Virtual Private Network ("VPN"). There are other variations of this embodiment (e.g., cruise ship as a variant of the mobile printing facility) that would be apparent to those skilled in the art based on this description, and in some cases they may be more advantageous.

In a presently preferred embodiment, the secure game server may be located at a separate secure data center 201' (e.g., Switch Supernap Data Center in Las Vegas, Nev.) with secure access granted to authorized users including super mini presses via the Internet. The location of the secure game server within a secure datacenter provides additional cost savings with the redundant utilities (e.g., uninterruptable power, climate control, Internet bandwidth, facility redundancy, etc.), physical security, access logistics, etc. provided by the secure datacenter provider. Typically, the security, reliability, and integrity of data centers greatly exceed the capabilities of traditional instant lottery ticket provider secure facilities. By locating the secure game server at a data center, scalability is provided with greater economies and efficiencies than is achievable with legacy isolated access print servers at printing faculties commonly practiced in the art.

Traditionally, instant ticket manufacturers are opposed to conducting game server operations over a remote networked data center due to security concerns. To date, all instant ticket manufacturers operate their game servers in private secure facilities collocated with at least one printing press and no standard connection to the Internet. However, as a practical matter, this network isolated game server paradigm significantly hampers economies while arguably compromising security. For example, numerous digital audits conducted by instant ticket manufacturing personnel and by outside auditors are typically performed on each game before it is printed. By isolating the secure game server at the print facility, outside auditors typically have to physically travel to the facility, thus increasing expenses and correspondingly shortening the audit time available for each game, as well as creating game scheduling problems. Additionally, various cryptographic security protocols (e.g., U.S. Pat. No. 8,043,154—"Bennett"), where instant ticket validation data are shuffled via a pseudorandom key known only to the sponsoring lottery or a trusted third party become troublesome and complex to implement with an isolated game server. Furthermore, secure isolated systems, by definition, feature very limited access by a few trusted individuals. Regretfully, history is rife with security failures of these types of limited access systems, because by restricting access to a few trusted individuals, the number of people required to conduct a successful conspiracy on a security system drops to a small enough number (e.g., one or two) that it is not uncommon for some unscrupulous personnel to attempt fraud. For example, in the year 2000 the Kansas Lottery's computer systems manager, Richard Knowlton, a "trusted" individual with unique system access was arrested for converting instant ticket validation files, transforming one hundred twenty-three losing lottery tickets to winning ticket validation codes for prizes that he then claimed. In this example, if more people had access to the Kansas instant ticket validation system this particular fraud would have most likely never occurred due to the need of Mr. Knowlton to recruit multiple accomplices.

Thus, with the preferred embodiment of networked secure game servers, "cloud" based services can be provided geographically independent to predefined groups of users with functional roles. By utilizing multiple layers of security with serial access granted by different devices, a cloud based game server can become accessible via the Internet yet still ensure that access is only granted to "trusted" individuals. For example, Access Control Lists "ACLs" (i.e., access control matrix stored separately one column at a time) security can be readily maintained on routers and/or firewalls for the limited number of authorized game server users (e.g., state lotteries, instant ticket provider, auditors, offsite super mini presses) thereby providing data-oriented security. At the same time application granularity via individual user "sandboxes" (i.e., a restricted environment where each user has at most temporary access to a restricted directory) with his or her own applet also managed by an Object Request Broker "ORB" (i.e., a software component resident on the game server that mediates communications between objects where separate objects can be applets accessing portions of instant ticket databases) could be maintained on the game server itself. The significant concept is that the combination of multiple security interfaces via serially linked components results in layered system level security is arguably more secure than the traditional isolated game server paradigm.

Figure 7A:
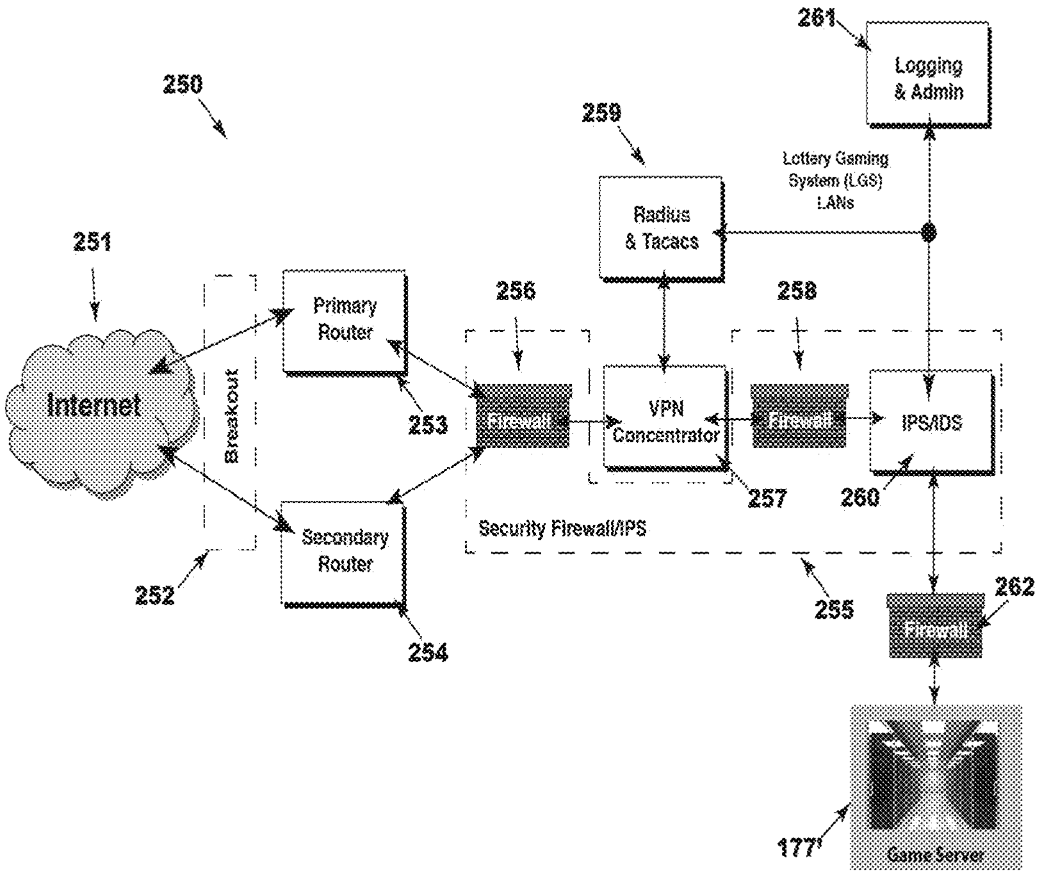
FIG. 7A is a diagram providing a graphical overview of a cloud based secure game server security access enabled by the embodiment of FIG. 7.

For example, FIG. 7A provides an illustration of one possible embodiment 250 of a cloud based (i.e., a game server 177 (FIG. 7) in a separate location from the presses and possibly game programming 154 (FIG. 7)) networked game server configuration that would securely support the embodiment 200 of FIG. 7. As shown in FIG. 7A, the networked game server system 250 receives and transmits data to and from authorized users including press servers over the Internet 251 via partially redundant serial paths through multiple separate security devices. In this example, access to the Internet 251 is provided by redundant protected Asynchronous Transfer Mode ("ATM") links carrying TCP/IP (Transmission Control Protocol/Internet Protocol) traffic routed through a secured breakout box 252 to redundant routers 253 and 254 (e.g., Cisco model number 3845 routers). TCP/IP traffic from either router 253 and 254 is then serially transmitted to the first firewall 256, VPN ("Virtual Private Network") concentrator 257, secondary firewall 258, IPS/IDS ("Intrusion Protection System/Intrusion Detection System") 260 and Demilitarized Zone or "DMZ" demarcation firewall 262 to the game server 177'.

Both routers 253 and 254 perform the first layer of security screening. Preferably, these routers would use Context-Based Access Control ("CBAC") to maintain a persistent state (based on information from inspected data packets) and use that state information to decide which traffic should be forwarded. Thus, the routers filter out unauthorized ports and access prior to the first firewall 256—effectively increasing the bandwidth of the firewall 256 and freeing it for more detailed security analysis of incoming data streams. With CBAC, the router access lists (e.g., authorized users' Internet addresses) define which sessions will be allowed to pass through the router 253 or 254, rather than specifying exactly which packets are to be allowed, thereby establishing the first layer of security for the networked game server 177'.

In this example, after the user data stream clears the appropriate router, it is then applied to the first firewall 256 for the next layer of security. The first firewall 256 automatically logs any connection from the outside, providing a listing of the address and Internet Protocol Security (IPsec)

identity of any user who has made or attempted to connect to the system. Additionally, the firewall 256 should only allow access according to a specified list (ACL) equipped with the ability to lock down access by port. Finally, the firewall 256 should also feature a "stateful inspection" feature that checks each session to ensure that no out-of-specification transmissions have been attempted—e.g., forbidden file types transmitted.

Next, the VPN concentrator 257 receives the user data stream passed by firewall 256. The user would now establish an encrypted session with the VPN concentrator 257. For the encrypted session to begin and the user allowed to continue to attempt to communicate with the game server 177', there ideally should be three layers of authentication that the user must pass, in addition to establishing a session encryption key with the VPN concentrator 257. When the user first attempts to establish a VPN session with the concentrator 257, the user should initially be challenged by the concentrator 257 to produce a first layer of authentication—e.g., Hash based Message Authentication Code (HMac) created with a keyed hash of a pseudorandomly chosen number (i.e., both the user and the VPN concentrator 257 have a priori knowledge of the shared authentication key before the session is started). Typically, if this layer of authentication fails, the VPN concentrator 257 should terminate the session with the failure registered in the administrative log 261.

Assuming the user passes the first layer of authentication, a VPN tunnel is created thereby ensuring that all future communications with the game server 177' are passed through the Internet 251 as ciphertext, including TCP/IP routing information at the user's facility and the game server 177' system. Immediately after the VPN tunnel is created, the concentrator 257 would request a second layer of authentication information from the user via the newly secured channel. In response, the user transmits a unique login and password through the VPN tunnel. The concentrator 257 would then receive and decrypt this second layer authentication information and then query a separate Radius server 259, which would log this attempt 261. Ideally, this authentication process involves confirming that the user's identity and password are valid as well as confirming that the data stream originated from the correct Internet Protocol (IP) address. The Radius server 259 would then inform the concentrator whether the user's authentication passed or failed. If the user is successfully authenticated, the concentrator 257 would allow the user to communicate with the game server 177' for the third (application) layer of authentication. However, if the user fails its second layer authentication, the concentrator 257 should immediately drop the VPN connection and log the event as before.

The third and final level of authentication is performed by the game server 177' itself. When the user is authenticated by the Radius server 259, the concentrator 257 then allows internal, clear text, communications to continue through the second firewall 258, by the IPS/IDS 260, ultimately to the game server 177'. The game server 177' then challenges the user to authenticate one last time at the application layer.

Figure 7B:
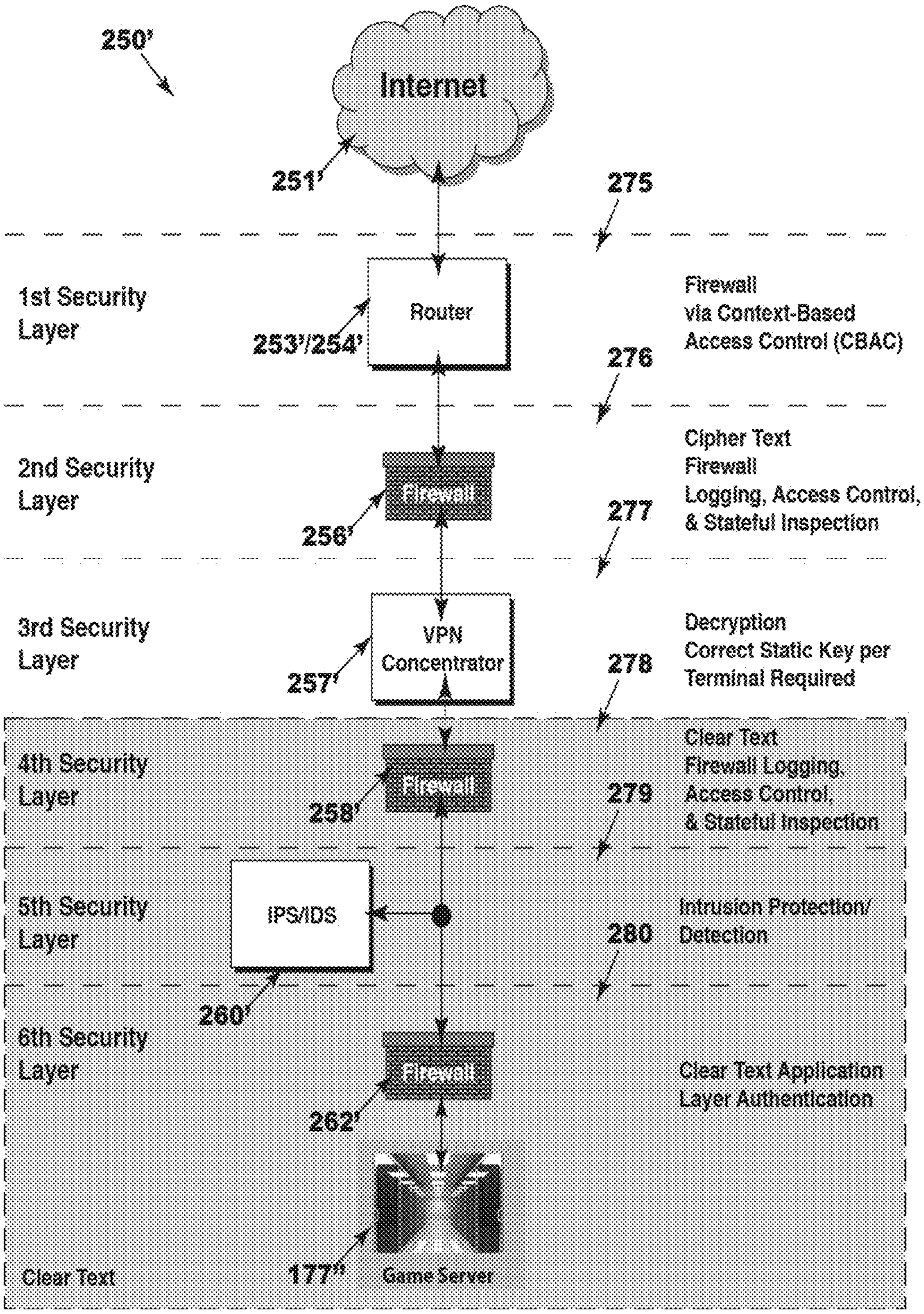
FIG. 7B is a diagram providing a graphical overview of the multiple security layers of the cloud based secure game server security access of FIG. 7A.

In summary, in the preferred example, to access the preferred cloud based game server 177' and 177" in example embodiments 250 and 250', six different layers of security 275 through 280 must be traversed by a user with three different levels of authentication—see FIG. 7B. The first layer of security 275 is between the Internet 251' and one of the two redundant routers 253' or 254'. As previously discussed, the router 253' or 254' function as a first level CBAC firewall. The second layer of security 276 is via another firewall 256' providing authentication access control and stateful inspection of the data stream. The third layer of security 277 is provided by the VPN concentrator 257' that requires the user to know an a priori encryption key. At this point, the accepted user data stream is converted from ciphertext to cleartext. The fourth layer of security 278 provides another firewall 258' that performs stateful inspection of the incoming data stream in cleartext. With the fifth layer of security 279, the DMZ is continuously analyzed by the IPS and IDS 260' for any erroneous activity. Ideally, this system is managed by a third party security firm familiar with the multiplicities of possible attacks originating from the Internet 251'. Finally, the sixth layer of security 280 is provided by another firewall 262' isolating the DMZ from the game server 177" with application level authentication performed by the game server 177" itself.

With these multiple layers of security 275 through 280 and authentication isolating the game server 177", the potential security disadvantages of configuring the game server 177" in the cloud with Internet access are mitigated with the resulting system arguably more secure than the traditional restricted trust and access security model currently employed for game servers. Therefore, the preferred cloud based networked game server embodiments 250 and 250' offers comparable or superior security to the prior art, while also enabling efficiencies and economies of production that were hereunto unattainable.

Returning to FIG. 7, with the distributed network 200, portions of a super-mini print on demand press run can be subdivided over multiple facilities 201, 202, 203, and 205 with respect to time, geographical proximity to lottery warehouses, type of imager press lines, workloads, etc., thereby enabling greater efficiencies in the printing process. Each of the multiple facilities 201, 202, 203, and 205 will have to include some form of physical security to minimize theft of product. However, with the invention of distributed processing network of digital imager printing lines 200, these remote security requirements can be greatly reduced in terms of digital security, since the game server 177 functions as the central data repository for all ticket production with only the allocated portions of imager data necessary for on demand printing distributed to the respective facility. Furthermore, generation by the game server 177 of ship file data (which, as its name implies, documents all packs of tickets that were produced and shipped) in the secure facility 201 that is ultimately transmitted with the validation file to the lottery central site, will include the complete listing of the shipped packs of tickets that are accounted for at the lottery warehouse. Thus, theft of one or more packs from a distributed printing facility would most likely be detected when the print run is received by the lottery. Packs that were plucked or not included in the shipment to the lottery would not be included in the ship file and therefore would not validate on the lottery central site system. Additionally, packs that were printed but not shipped (e.g., plucked for quality assurance or damaged in the printing process) could be listed in a separate "stolen pack file" also generated by the game server 177 that would ultimately be sent to the lottery central site responsible for game validation. The stolen pack file provides an extra layer of security for the validation system—i.e., the absence of a pack from the validation file would cause any ticket in the pack to not validate; however, the presence of a ticket from a pack appearing in the stolen pack file would provide a positive indication that a nefarious validation is being attempted, thereby flagging the attempt for lottery security.

Figure 8:
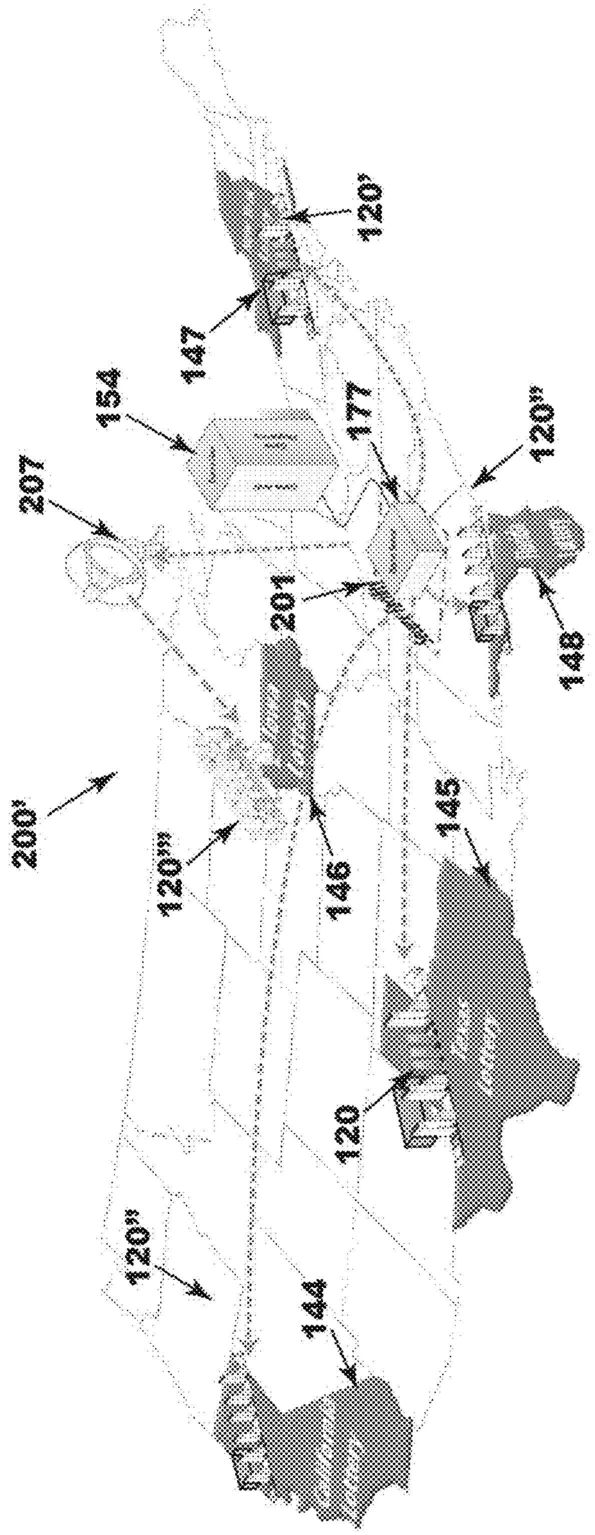
FIG. 8 is an exemplary diagram providing a graphical overview of the distributed printing system of FIGS. 7, 7A, and 7B.

When the distributed network 200 super-mini print on demand press lines are compared to the traditional, prior art, production and distribution example of five lotteries 144 through 148 across the continental United States, graphically illustrated in FIG. 6, the newfound efficiencies become apparent. As shown in FIG. 8, the distributed network of 200' enables a geographically diverse network of printing lines (i.e., printing lines 120, 120', 120", and 120") that can theoretically be placed in each jurisdiction 144 through 148 in which a lottery has a contract with the instant ticket provider. This geographical diversity of smaller printing facilities, rather than one large "big bang" facility, achieves efficiencies in ticket, production previously unknown. By providing local super-mini printing in each lottery jurisdiction, the problems of inventory control, production delay, and new game design are resolved. The localized super-mini printing facilities designed for smaller volume print runs with virtually no make-ready time required between games enables print on demand at low volumes with very little lead time required for placement on sale at the retailer.

Regardless of the distributed printing process, paper substrates must be shipped to each location, ultimately with the same weight of paper arguably being shipped to the same locations. However, when it is realized that shipment of a raw paper substrate (possibly enabled by the embodiment of FIG. 3) may be from local suppliers and that the raw substrate may be ordered directly from the manufacturer with long delivery times or from local suppliers (thereby reducing shipping costs), it can be seen that savings in the raw product logistics may be achieved. When the time required between producing the finished product instant lottery ticket and shipping it to the retailer is also considered, this savings grows substantially.

Returning to FIG. 8, the network 200' of print on demand press lines are geographically separate from the secure facility 201 and its game server 177. As previously discussed, this separation eliminates shipping costs and delays by enabling the actual instant lottery ticket product to be produced local at the lottery jurisdiction. As also shown in FIG. 8, game programming, game generation, and game audit are physically executed 154 in a location outside of the secure facility 201 and the game server 177. With this networked embodiment, separation of game programing, etc. from the secure servers become possible, since the actual shuffle (i.e., assigning prize values to tickets), as well as, optionally, shuffle seed generation, is conducted exclusively within the game server 177 in the secure facility 201.

Once the shuffle (i.e., prize assignments to tickets) and image data have been created by the game server 201, the resulting game data may be audited 154 remotely by examining generated proxy (i.e., pools of ticket data not intended to be printed) and summary data. The actual instant lottery ticket image data will reside on the game sever 201 until required for physical printing. At that time the game server 201 will transmit the instant lottery ticket image data directly to the super-mini digital imager press lines 120, 120', 120", or 120'" over the network via a secure encrypted link, preferably a VPN tunnel. The instant lottery ticket image data are decrypted at the super-mini digital imager press lines sites.

As previously disclosed and illustrated in FIG. 2, FIG. 4, and especially in FIG. 5, the super-mini digital imager press lines incorporated by the distributed network are primarily comprised of digital imagers of a much more technically sophisticated nature than the traditional fixed plate hybrid press line 100 of FIG. 1. This higher level of technical sophistication along with smaller size typically requires fewer press operations personnel (e.g., one or two) for super-mini imager systems than traditional presses (e.g., eight to twelve). Aside from obvious labor savings from reduction of the number of operations personnel required to operate the networked super-mini imager system, the skills required to operate the networked super-mini imager system are also greatly reduced. This corresponding reduction in skill set requirements for networked super-mini imager system operators also allows for sharing of press operators with other duties such as cooperative services functions at a lottery warehouse. Thus, it is possible that the network of super-mini imagers may be installed over geographically diverse areas without the need to expand the labor force beyond existing cooperative service warehouse workers.

FIG. 8 illustrates the embodiment of a mobile networked super-mini imager press line 120'" wholly contained in a typical truck trailer with communications achieved via a satellite 207. The relatively small size of super-mini imager systems—e.g., approximately 40 feet (≈412 meters) in length for embodiment 120"—enables the complete production line (i.e., imager and packaging) to fit into a typical truck trailer with a length of approximately 48 to 50 feet (≈14.6 to ≈15.8 meters) and a height of around 109 inches (≈277 centimeters). This portability of the super-mini system allows for production to be transported where needed at specific times. For example, smaller lotteries (e.g., Delaware, South Dakota, etc.) may elect to transport the mobile production facility to their jurisdiction to produce instant lottery tickets for a given period (e.g., holiday season), thereby allowing the instant lottery ticket provider to bid on production contracts requiring some portion of production to be contained within the lottery's states. Another example would be enabling production of micro (i.e., less than 100,000) print runs of lottery tickets for specific events such as state fairs, sporting events, promotional activities, etc. The embodiment of mobile instant lottery ticket production thereby enables new types of game designs specifically targeted for new demographics.

Figure 9:
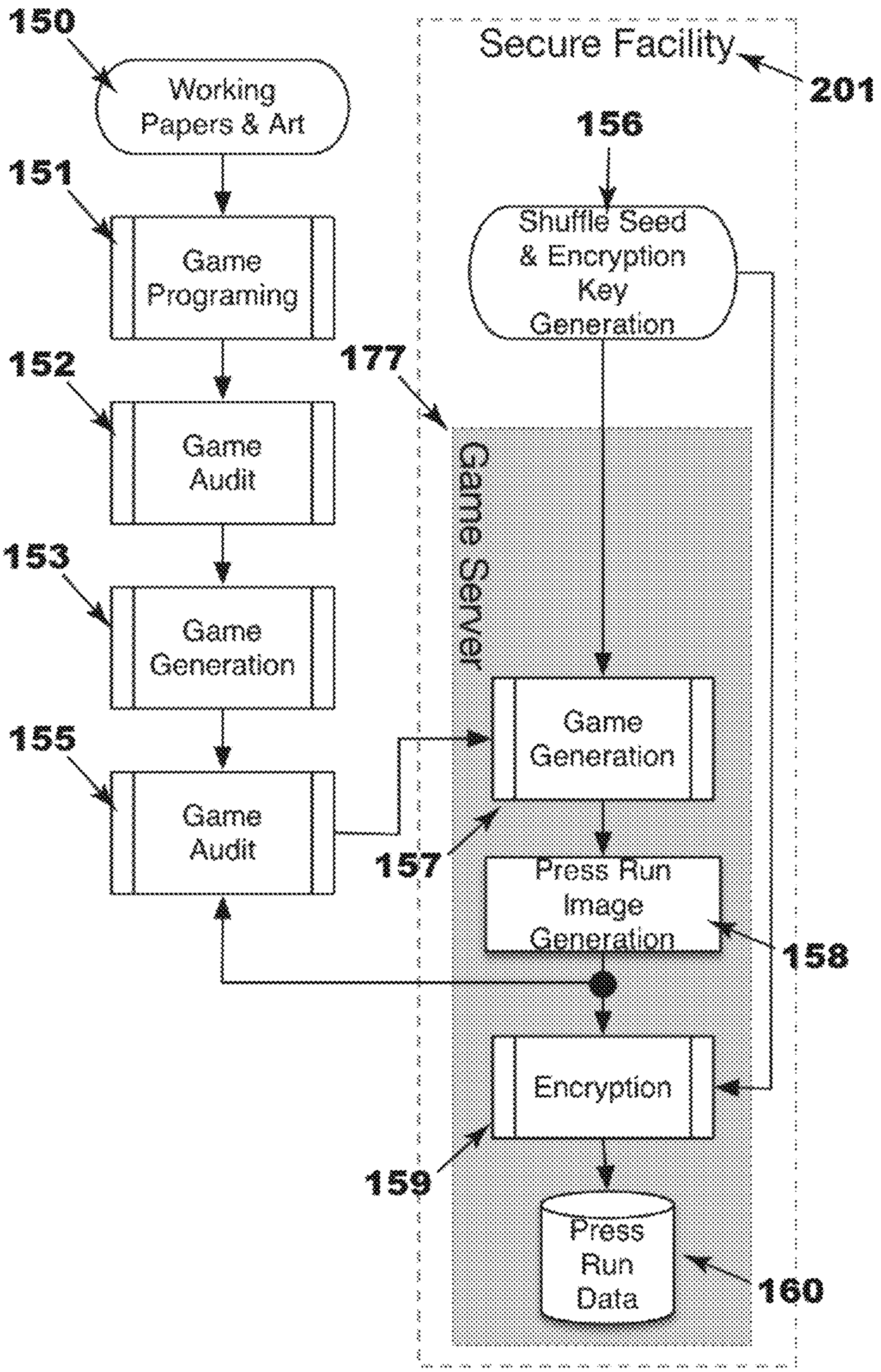
FIG. 9 is a flowchart providing a graphical overview of a first embodiment as applied to the preproduction process and compatible with the embodiment of FIGS. 7, 7A, and 7B and FIG. 8; and, FIG. 10 is a flowchart providing a graphical overview of a first embodiment as applied to the production process and compatible with the embodiments of FIGS. 7, 7A, and 7B, FIG. 8, and FIG. 9.

FIG. 9 is a flowchart illustrating a process of creating super-mini digital images for instant lottery ticket press runs. As shown in the figure, the process begins with creating a specification and associated artwork or "working papers" 150 describing the tickets' appearance, the game play, the payout, the odds of winning, etc. Once created and agreed upon by all relevant parties, the working papers developed at step 150 are used to specify the game programing at step 151, the audit regime at steps 152 and 155, and the game generation software at step 153 that will determine which tickets win, as well as how the game indicia and display appear on the tickets. As illustrated in FIG. 9, all of this processing may be executed outside of the secure facility 201.

After the game specific software is created at step 151 and audited at step 152 per the working papers, sample pools of known ticket images are created with known non-secure seeds (i.e., seeds generated for the purpose of testing) with the resulting game output at step 153 audited at step 155 for compliance with the working papers. Assuming the generated test game audits correctly, then the game software, artwork, etc. are transmitted to the secure game server 177 physically housed in the secure facility 201. A live game generation at step 157 (where the game output images will be printed as physical instant lottery tickets and placed on sale) is then conducted on the secure game server 177 using secure (i.e., secret or non-disclosed) shuffle seeds 156 generated by some mechanism within the secure facility 201, or within the game server itself 177, or generated internally by a third party (e.g., lottery). The resulting game output is converted to image data 158 compatible with the super-mini digital imager printing lines 120, 120', 120", and 120'" (FIG. 8). These image data are then encrypted at step 159 (FIG. 9) and stored in the game server 177 database at step 160, where it awaits transmission to a networked super-mini digital imager printing line 120, 120', 120", and 120'" (FIG. 8) at the time of the print run. As shown in FIG. 9, in a preferred embodiment the encryption keys at step 156 for the game image data are generated by the same mechanism that generates the shuffle seeds. However, in an alternative embodiment, the encryption keys could be generated by an external source (e.g., lottery). As also shown in the figure, a portion of the generated game image data are transmitted outside of the game server 177 and secure area 201 to an external audit at step 155. As would be apparent to one skilled in the art in view of this disclosure, the portions of generated game data transmitted for an external audit would be a defined lot of image data (e.g., pack, pool, etc.) that are generated with the same shuffle seeds and algorithm as the actual game data, but would be voided from the ship file and never be printed or sold in the field. For additional security, the pack numbers of virtual tickets generated for the audit could also be placed in the associated stolen pack file for the pending game.

Figure 10:
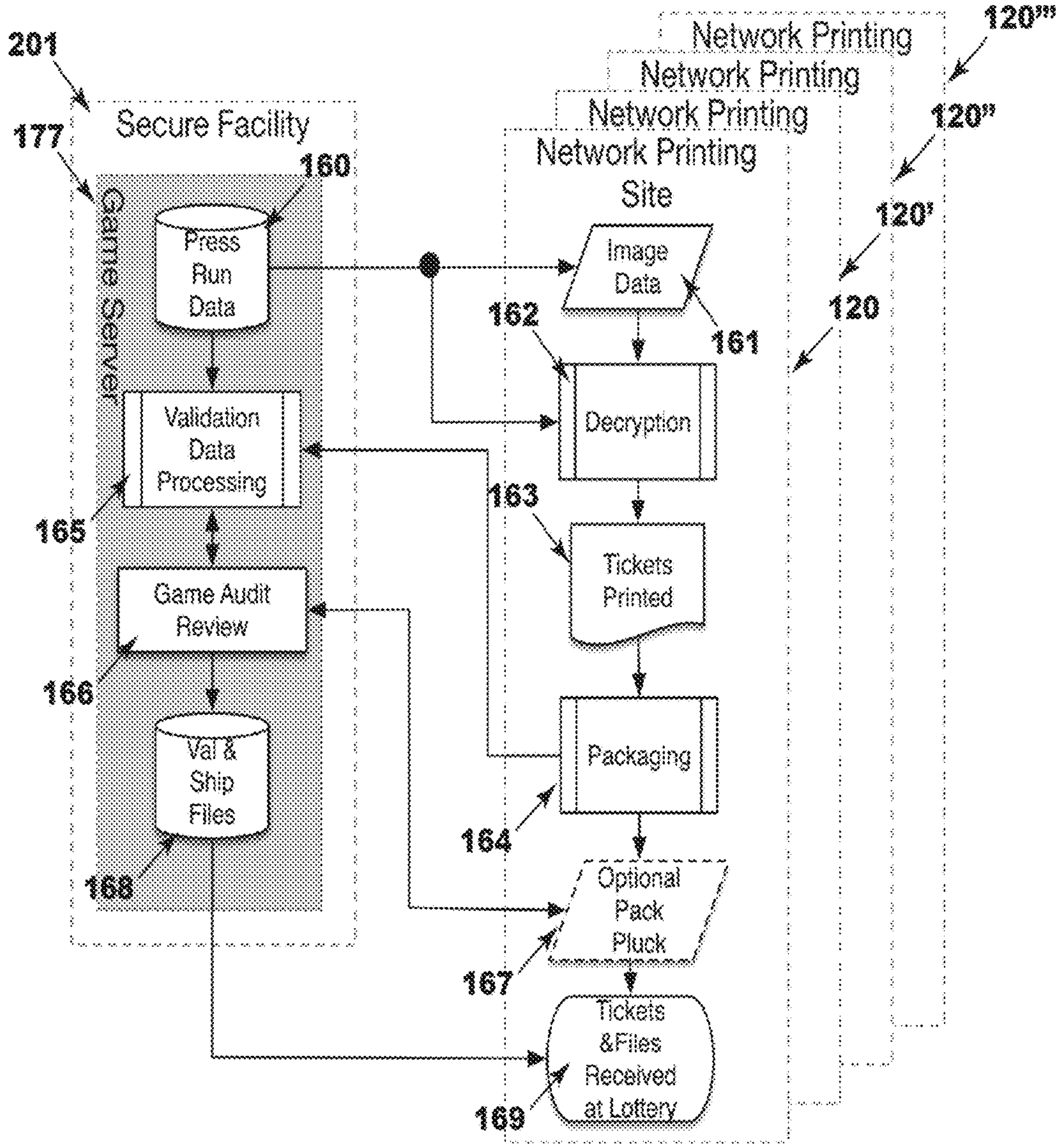

When it is time to print the instant ticket image data stored in game server 177, a portion of or the entire database at step 160 of one or more of the networked printing lines 120, 120', 120", and/or 120'" (FIG. 10) is granted access at step 161 to the image data at step 160 for the pending press run. The applicable image data for the game run or portion of the game run are then transferred at step 161 to the appropriate printing line 120, 120', 120", or 120'" on the network where, most probably, at least a portion of the image data (e.g., variable indicia) is encrypted. The encrypted portion of the image data is then decrypted at step 162 at the printing line 120, 120', 120", or 120'" with key access gained from the game server 177 database at step 160 via a separate protocol or by other means if the encryption key was generated outside of the game server 177. The resulting cleartext image data are then physically printed by the super-mini imager at step 163, then slit and separated into packs at step 164 in preparation for shipping. The pack numbers of the completed packs are transferred back to the game server 177 at the secure facility 201 for processing at step 165 to generate and complete the ship and validation files that will ultimately be transferred to the lottery's central site. Optionally, some processed packs may be plucked at step 167 (i.e., removed from distribution and never placed on sale) for quality assurance, audit, or other purposes with the plucked pack numbers transmitted across the network to the game server 177 for audit at step 166 that includes removal from the ship file (as well as added to the stolen pack file) and confirmation that the indicia printed under the plucked pack's SOC agree with the database at step 160. After the optional pluck is completed, the packs of instant tickets are shipped to the lottery warehouse with the associated ship, stolen packs, and validation files transmitted to the lottery's central site at step 169.

It should be appreciated by those skilled in the art in view of this description that various modifications and variations may be made present invention without departing from the scope and spirit of the invention. It is intended that the present invention include such modifications and variations as come within the scope of the appended claims.

What is claimed is:

1. An instant ticket networked production method for just in time production of instant tickets for games defined by a plurality of tickets with variable indicia imaging data hidden by a Scratch-Off Coating (SOC) using a networked production system, the networked production method comprising:

(a) shuffling or assigning prizes to individual tickets conducted by a networked game server within a secure facility;

(b) generating the imaging data from the shuffled instant tickets and converting the imaging data into ciphertext;

(c) remotely transmitting the programming and game generation ciphertext imaging data to the game server;

(d) providing external audit access to the game server, such that portions of the imaging data may be reviewed by a third party in cleartext;

(e) providing secure interfaces to at least one super-mini digital press, such that the imaging data can be downloaded on demand;

(f) remotely downloading the imaging data ciphertext from the game server;

(g) decrypting the downloaded programming and game generation ciphertext local to the at least one super-mini digital press, thereby converting the ciphertext imaging data from the game server to cleartext suitable for printing;

(h) transferring production data from the at least one super-mini digital press to the game server in the secure facility for generation of ship and validation files; and (i) performing data or file segmentation, thereby partitioning the imaging data into discrete pools or packets enabling downloading of individual pools or packets to different printing facilities on demand, wherein printing economies for the instant tickets are realized via just in time instant ticket production.

2. The instant ticket networked production method of claim 1, wherein the production data transferred remotely from the at least one super-mini digital press is used to generate a stolen pack file.

3. The instant ticket networked production method of claim 1, wherein at least two super-mini digital presses are provided that are located in different geographical areas from each other.

4. The instant ticket networked production method of claim 1, wherein at least two super-mini digital presses are provided that print separate discrete portions of a same game.

5. The instant ticket networked production method of claim 1, wherein the same game is printed in multiple portions at different times.

6. The instant ticket networked production method of claim 1, wherein game server access is provided over the Internet.

7. The instant ticket networked production method of claim 1, wherein two or more remote super-mini digital presses are granted limited access to the game server.

8. The instant ticket networked production method of claim 1, wherein non-production personnel are granted limited access to the game server.

* * * * *